United States Patent
Fierle et al.

(10) Patent No.: US 6,581,676 B2
(45) Date of Patent: Jun. 24, 2003

(54) ROTOR DESIGN WITH DOUBLE SEALS FOR VERTICAL AIR PREHEATERS

(75) Inventors: Kurt M. Fierle, Wellsville, NY (US); Lawrence J. Muscato, Bolivar, NY (US)

(73) Assignee: ABB Alstom Power N.V., Amsterdam (NL)

( * ) Notice: Subject to any disclaimer, the term of this patent is extended or adjusted under 35 U.S.C. 154(b) by 0 days.

(21) Appl. No.: 09/974,508

(22) Filed: Oct. 10, 2001

(65) Prior Publication Data

US 2002/0070001 A1 Jun. 13, 2002

Related U.S. Application Data

(62) Division of application No. 09/576,308, filed on May 22, 2000, now Pat. No. 6,345,442.

(51) Int. Cl.$^7$ ................................................. F23L 15/02
(52) U.S. Cl. ............................................. 165/9; 165/8
(58) Field of Search .................... 165/8, 9; 122/1 A, 122/DIG. 2

(56) References Cited

U.S. PATENT DOCUMENTS

| | | | | |
|---|---|---|---|---|
| 5,005,634 A | * | 4/1991 | Reeves et al. ................. | 165/9 |
| 5,048,595 A | | 9/1991 | Harder ........................... | 165/9 |
| 5,363,906 A | * | 11/1994 | Borowy ......................... | 165/9 |
| 5,456,310 A | | 10/1995 | Brophy et al. ................. | 165/9 |
| 5,836,378 A | | 11/1998 | Brophy et al. ................. | 165/9 |
| 5,915,339 A | | 6/1999 | Cox et al. ..................... | 122/1 A |
| 6,257,318 B1 | * | 7/2001 | Fierie et al. ................... | 165/8 |
| 6,397,785 B1 | * | 6/2002 | Fierle ............................ | 165/8 |

OTHER PUBLICATIONS

International Search Report corresponding to International Application No. PCT/US 01/13016 dated Apr. 12, 2001.
Boilers And Combustion Systems, "Expect More Performance From Today's Air Heaters", 862 Power, 139 (1995) Mar., No. 3, New York, US.

* cited by examiner

Primary Examiner—Henry Bennett
Assistant Examiner—Terrell McKinnon
(74) Attorney, Agent, or Firm—Alix, Yale & Ristas, LLP

(57) ABSTRACT

A method for adding additional axial seals and radial seals within existing air preheaters. The installed heat transfer baskets, radial seals, axial seals, and gratings are all removed from the air preheater. The existing stay plates are modified, if they are to be reused, or replaced with new stay plates. An intermediate diaphragm plate is positioned in each original compartment and mounted to the stay plates. Additional hot and cold end axial seal support bars are mounted to the rotor shell and intermediate diaphragm plate. Axial seals are installed on the original and additional axial seal support bars and radial seals are installed on the axial edges of the original and intermediate diaphragm plates. Finally, new heat transfer baskets are inserted into each of the compartments formed by the original diaphragm plates, the intermediate diaphragm plates, and the rotor shell.

10 Claims, 13 Drawing Sheets

ROTOR DESIGN WITH DOUBLE SEALS FOR VERTICAL AIR PREHEATERS

RELATED APPLICATION

This application is a divisional of U.S. patent application Ser. No. 09/576,308 filed May 22, 2000, now U.S. Pat. No. 6,345,442.

BACKGROUND OF THE INVENTION

The present invention relates to the axial seals and radial seals of a rotary regenerative air preheater for controlling leakage within the air preheater. More particularly, the invention relates methods and apparatus for adding additional axial seals and radial seals within installed air preheaters.

A rotary regenerative air preheater transfers sensible heat from the flue gas leaving a boiler to the entering combustion air through regenerative heat transfer surface in a rotor which turns continuously through the gas and air streams. The rotor, which is packed with the heat transfer surface, is divided into compartments by a number of radially extending plates referred to as diaphragms. These compartments are adapted to hold modular baskets in which the heat transfer surface is contained.

The air preheater is divided into a flue gas side or sector and one or more combustion air sides or sectors by sector plates. In a typical installed rotary regenerative heat exchanger, rigid or flexible radial seals mounted on the top and bottom edges of the diaphragms are in close proximity to these sector plates and minimize leakage of air and/or gas between sectors. Similarly, rigid or flexible axial seals mounted on the outboard edge of the diaphragms are in close proximity to axial seal plates mounted on the inner surface of the housing and minimize leakage therebetween. In typical installed air preheaters, the number of diaphragms and the width of the sector plates and the seal plates are such that only one radial seal and one axial seal is disposed proximate to the respective plate at any one time. These seals are proximity seals and are not designed to contact the sealing surface of the sector plates or seal plates. Consequently, there is leakage past the seals where the amount of leakage is dependent on the pressure differential between the air and gas streams across the seals. Leakage can degrade thermal performance and require increased energy use resulting in higher costs for powering the fans. The leakage flow carries ash which produces erosion of the seals and sealing surfaces.

SUMMARY OF THE INVENTION

The present invention relates to a method for adding additional axial seals and radial seals within existing air preheaters. To retrofit the additional seals, the original heat transfer baskets, the original radial seals, the original axial seals, and the original gratings are all removed from the air preheater. If the original stay plates are not to be re-used, they are removed. If the original stay plates are to be re-used, a strip of material is removed from the outer stay plates to accept an intermediate diaphragm plate, hot and cold extension plates are mounted on the inner stay plates. At this point an intermediate diaphragm plate is positioned within each original compartment and mounted to the inner and outer stay plates. Cold extension plates are then mounted on the outer stay plates. New gratings are mounted to the original diaphragm plates and the intermediate diaphragm plate if the basket supports comprise a combination of gratings and stay plates. Additional hot and cold end axial seal support bars are mounted to the rotor shell and intermediate diaphragm plate. Axial seals are installed on the original axial seal support bars and on the additional axial seal support bars and radial seals are installed on the axial edges of the original diaphragm plates and the intermediate diaphragm plates. Finally, new heat transfer baskets are inserted into each of the compartments formed by the original diaphragm plates, the intermediate diaphragm plates, and the rotor shell.

DESCRIPTION OF THE PREFERRED EMBODIMENT

Figure 1:
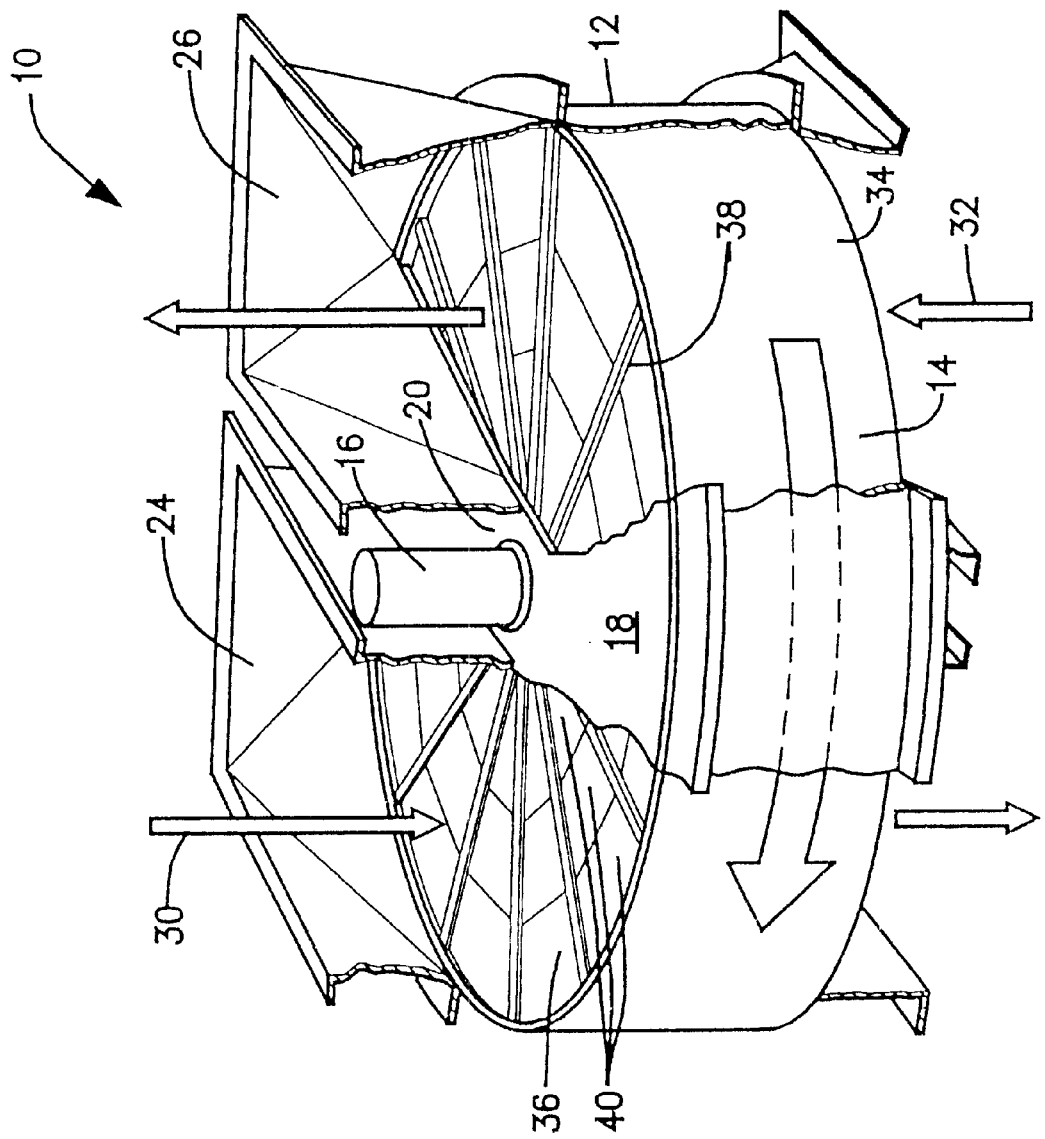
FIG. 1 is a general perspective view of a conventional bisector rotary regenerative air preheater which is cut-away to show the upper sector plates.
Figure 4:
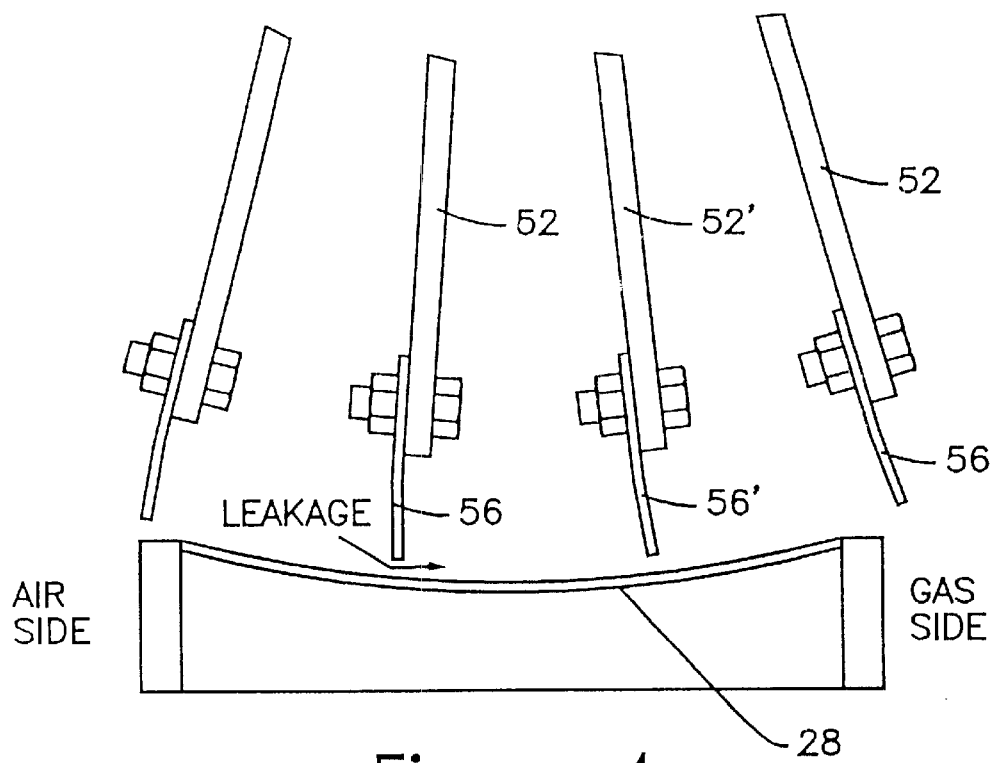
FIG. 4 is a cross section view of an axial seal plate and a portion of a rotor which has been modified in accordance with the present invention illustrating the double seal arrangement.

FIG. 1 of the drawings is a partially cut-away perspective view of a typical bi-sector air preheater 10 showing a housing 12 in which the rotor 14 is mounted on a drive shaft or post 16. The housing is divided by means of the flow impervious sector plates 18 and 20 into a flue gas sector 24 and an air sector 26. Corresponding sector plates are also located on the bottom of the unit. Mounted on the inside of the housing are axial seal plates 28 which extend the full height of the rotor (FIG. 4).

The hot flue gases enter the air preheater 10 as indicated by the arrow 30, flow through the flue gas sector 24 where heat is transferred to the heat transfer surface in the rotor 14. As this hot heat transfer surface then rotates through the air sector 26, the heat is transferred to the air flowing through the rotor from the bottom as indicated by the arrow 32. Consequently, the cold air inlet and the cooled gas outlet define a cold bottom end and the hot gas inlet and the heated air outlet define a hot top end. The rotor 14 has a shell 34 and is divided into a plurality of pie-shaped compartments 36 by the diaphragm plates 38 with each compartment containing a plurality of heat exchange basket modules 40.

Figure 2:
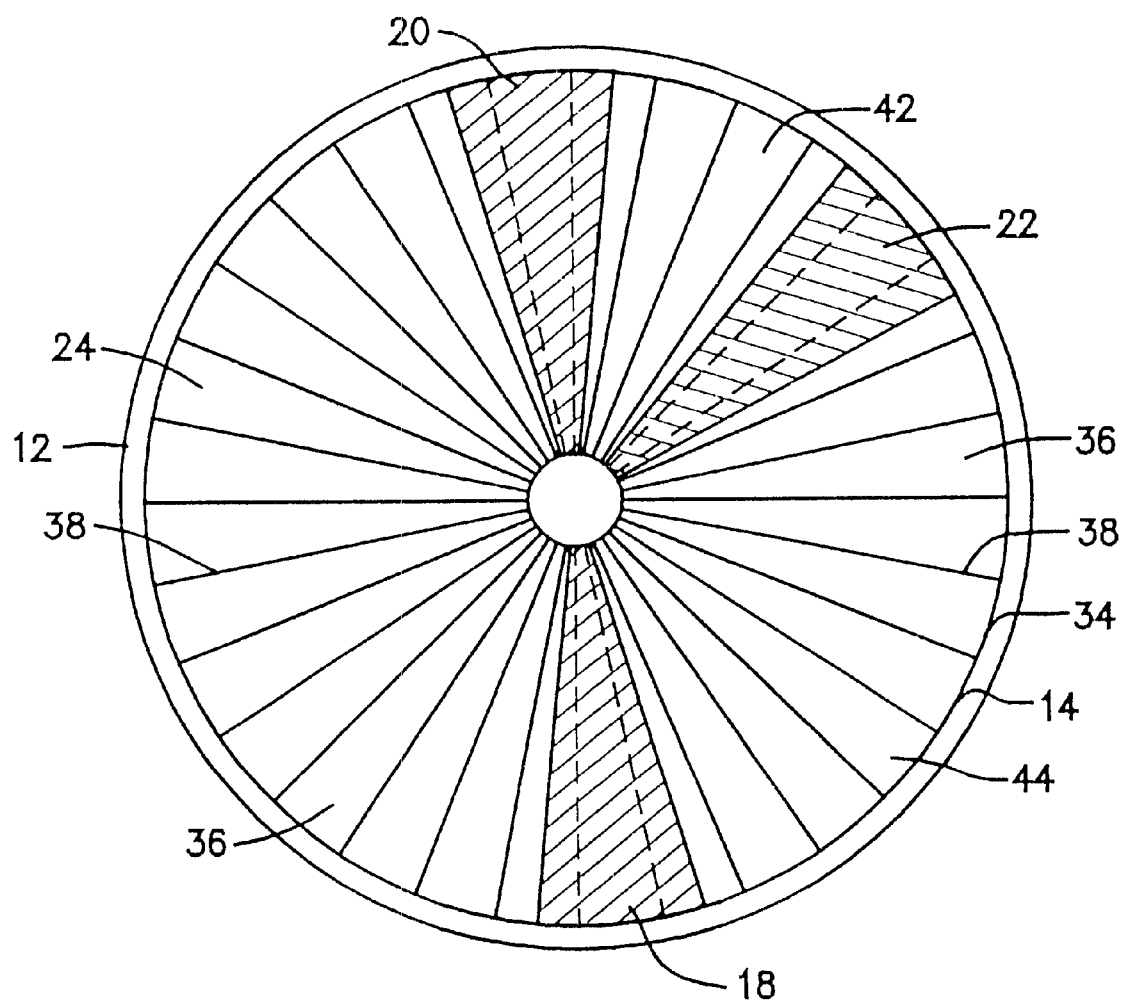
FIG. 2 is a simplified top view of a conventional trisector air preheater showing the rotor in the housing and showing the sector plates.
Figure 3:
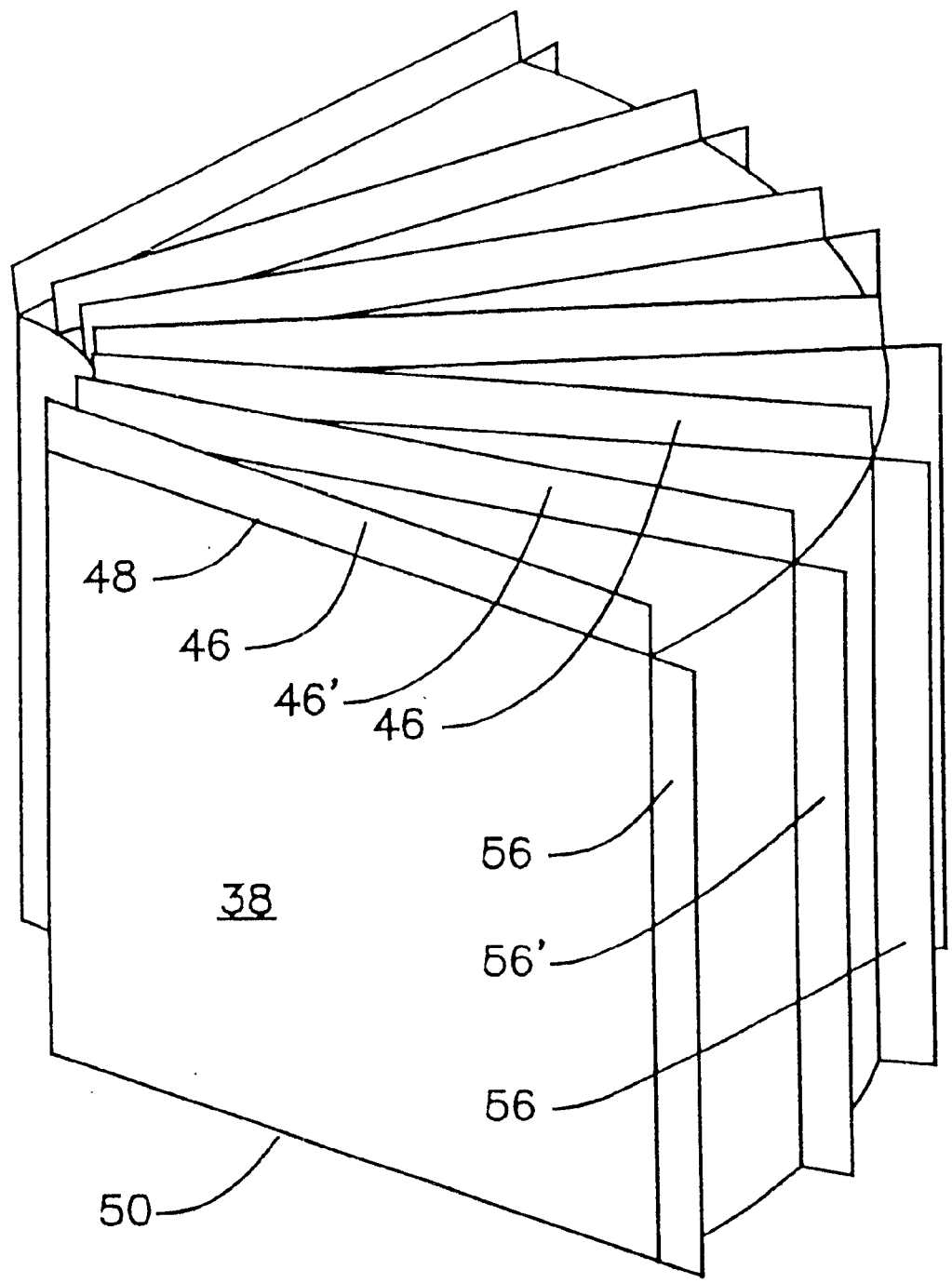
FIG. 3 is a simplified perspective view of a section of the rotor assembly of an air preheater which has been modified in accordance with the present invention.

FIG. 2 is a plan view representation of a conventional trisector air preheater comprising the rotor housing 12 and the rotor 14. The housing is divided in this case into three sectors by the sector plates 18, 20 and 22. The sectors are the flue gas sector 24 and the air sector 26 which is divided into the primary air sector 42 and the secondary air sector 44. This figure illustrates the sector plates in cross-section for purposes of clarity. The rotor 14 is composed of the shell 34 and the diaphragm plates 38 dividing the rotor into compartments 36.

In conventional air preheaters, radial seals 46 are attached to the top and bottom axial edges 48, 50 of each diaphragm plate 38 and engage the sector plates 18, 20, 22 as the rotor 14 revolves to control leakage past the hot and cold ends of the diaphragm plates 38. Hot and cold end axial seal support bars 52, 54 are mounted on the rotor shell 34 in line and the outboard radial edge of each diaphragm plate 38. Axial seals 56 attached to the hot and cold end axial seal support bars 52, 54 engage the seal plates 28 as the rotor 14 revolves to control leakage past the outboard periphery of the rotor 14. The size of the sector plates 18, 20, 22 and seal plates 28 and the number of diaphragm plates 38 to which seals may be attached are limited in conventional air preheaters such that only one radial seal 46 and one axial seal 56 are positioned adjacent the respective plate at any one time. These seals 46, 56 are proximity seals and are not designed to contact the sealing surface of the sector plates 18, 20, 22 or seal plates 28. Consequently, there is leakage past the seals 46, 56 where the amount of leakage is dependent on the pressure differential between the air and gas streams across the seals 46, 56. The flow between the air and gas streams carries ash which produces erosion of the seals 46, 56 and sealing surfaces 18, 20, 22, 28, degrades thermal performance, and increases energy use of the fans.

Figure 5:
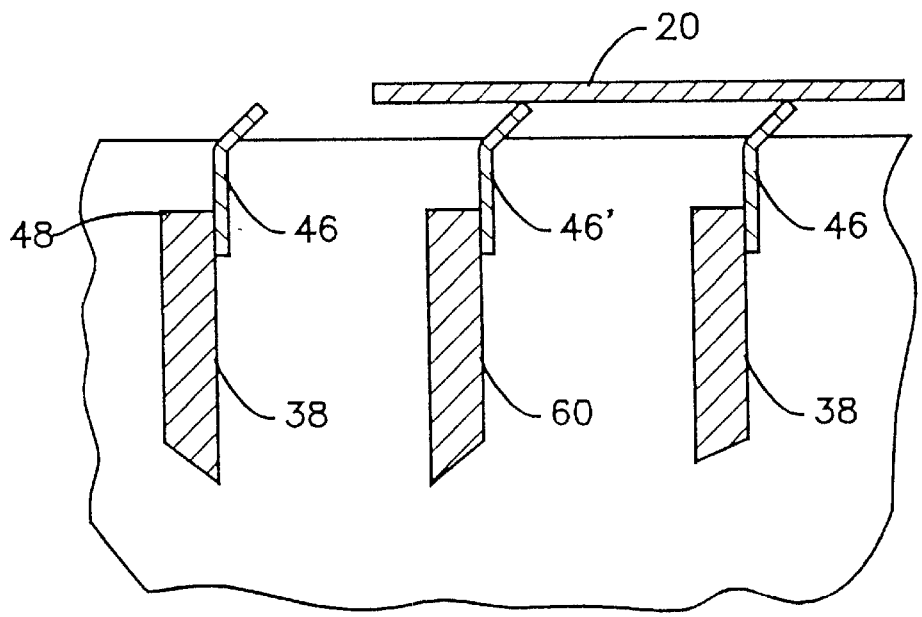
FIG. 5 is a cross section view of a sector plate and a portion of a rotor which has been modified in accordance with the present invention illustrating the double seal arrangement.
Figure 6:
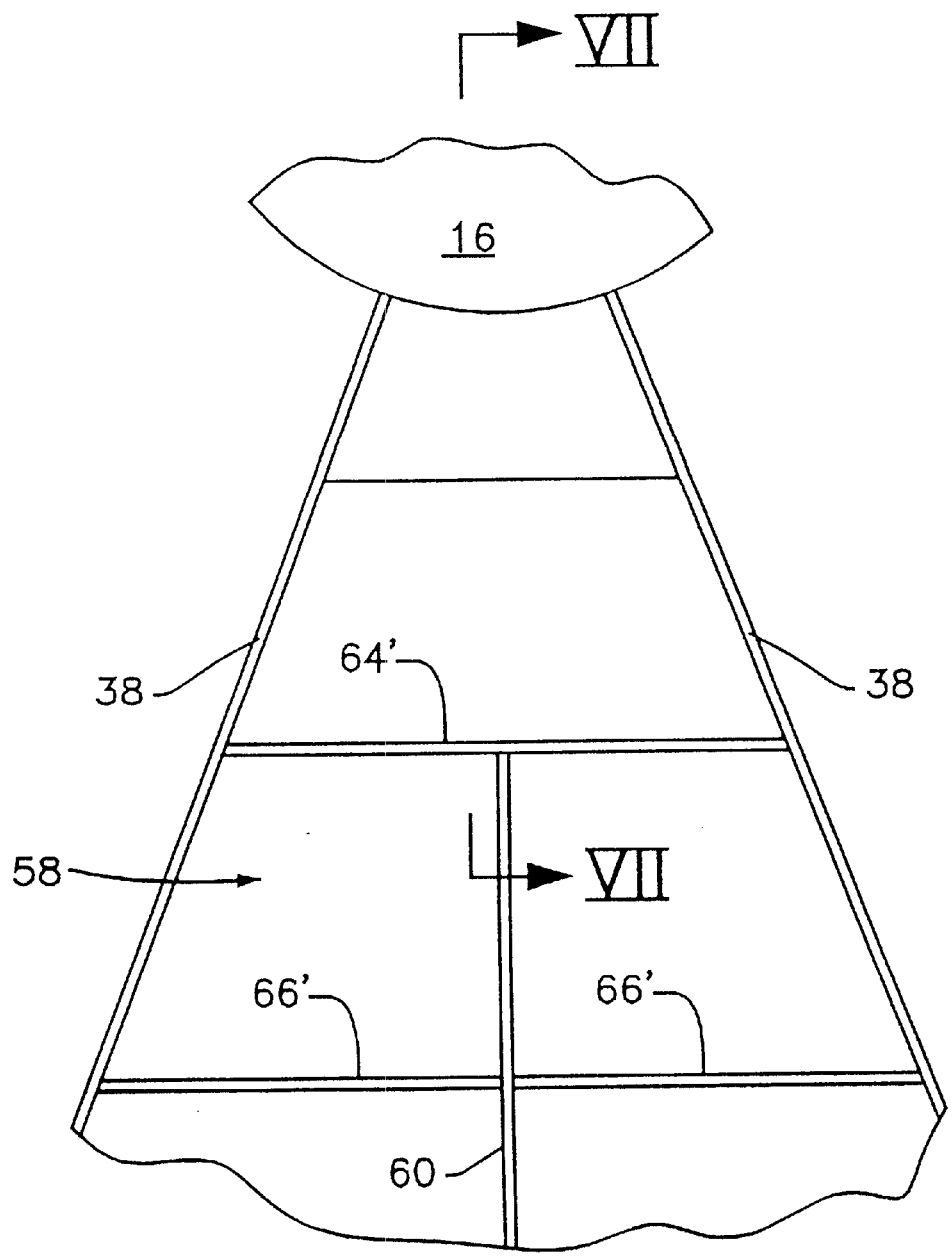
FIG. 6 is a top view of the inboard portion of the rotor of FIG. 3 illustrating the post, a pair of existing diaphragm plates, an intermediate diaphragm plate, and stay plates.

The rotor 14 of a conventional vertical air preheater which has been modified in accordance with the subject invention has an additional radial seal 46' and an additional axial seal 56' mounted intermediate each pair of the original or existing diaphragm plates 38, such that two radial seals 46, 46' and two axial seals 56, 56' are in engagement with the sector plates 18, 20, 22 and seal plates 28, respectively, at the same time. This is illustrated in FIGS. 4 and 5. Since the pressure differential between the air and gas streams now drops across two sets of radial and axial seals, the volume of leakage flow is reduced by approximately fifty percent (50%) compared to the leakage flow rate for a single set of radial and axial seals. Since the leakage flow is reduced, the flow of ash carried in the leakage flow is reduced proportionally, reducing erosion, and thermal performance and energy use are improved.

Conventional vertical air preheaters do not have the mechanical structure required to support the additional radial and axial seals since these new seals 46', 56' are installed intermediate the existing diaphragm plates 38. Therefore, additional mechanical support 58 positioned intermediate the existing diaphragm plates 38 is required to support the new seals 46', 56'. The intermediate diaphragm plate 60 is approximately the same height as the existing diaphragm plates 38 to assure a complete seal from the hot end to the cold end of the rotor 14.

The nature of the additional mechanical support 58 is primarily determined by the way that the heat transfer baskets 40 are loaded in the rotor 14. The method of loading dictates which basket support elements, such as gratings 62, stay plates 64, 66, stay plate extensions 68, 70, 72, and basket support bars 74, are utilized to form a basket support structure. Conventional vertical air preheaters utilize one of two basic configurations of basket support elements: 1) a support structure composed of a combination of stay plates 64, 66 and gratings 62 is used for duct loaded and side loaded baskets and 2) a support structure composed of all stay plates 64, 66 is used when all the baskets are duct loaded. Consequently, the subject invention includes two different designs for the additional support structure that is required to accommodate the additional seals of the subject invention.

The elements required to provide the proper mechanical support to the new seals 46', 56' include an intermediate diaphragm plate 60 centered between the existing diaphragm plates 38 that define each of the existing compartments 36 and additional hot and cold axial seal support bars 52', 54' to support the new axial seals 56'. The intermediate diaphragm plate 60 extends from the outboard surface of the inner stay plate 64', 65 to the rotor shell 34 and has the same thickness or is thinner than the existing diaphragm plates 38. Additional gratings 62 and/or stay plate extensions 68, 70, 72 or new stay plate's 65, 67 and/or basket supports 94 are mounted to the intermediate and existing diaphragm plates 60, 38 to provide support for the heat exchange baskets 40'. It should be noted that after the modification of an air preheater having side loaded baskets, all of the innermost baskets 40' will need to be duct loaded.

Figure 7:
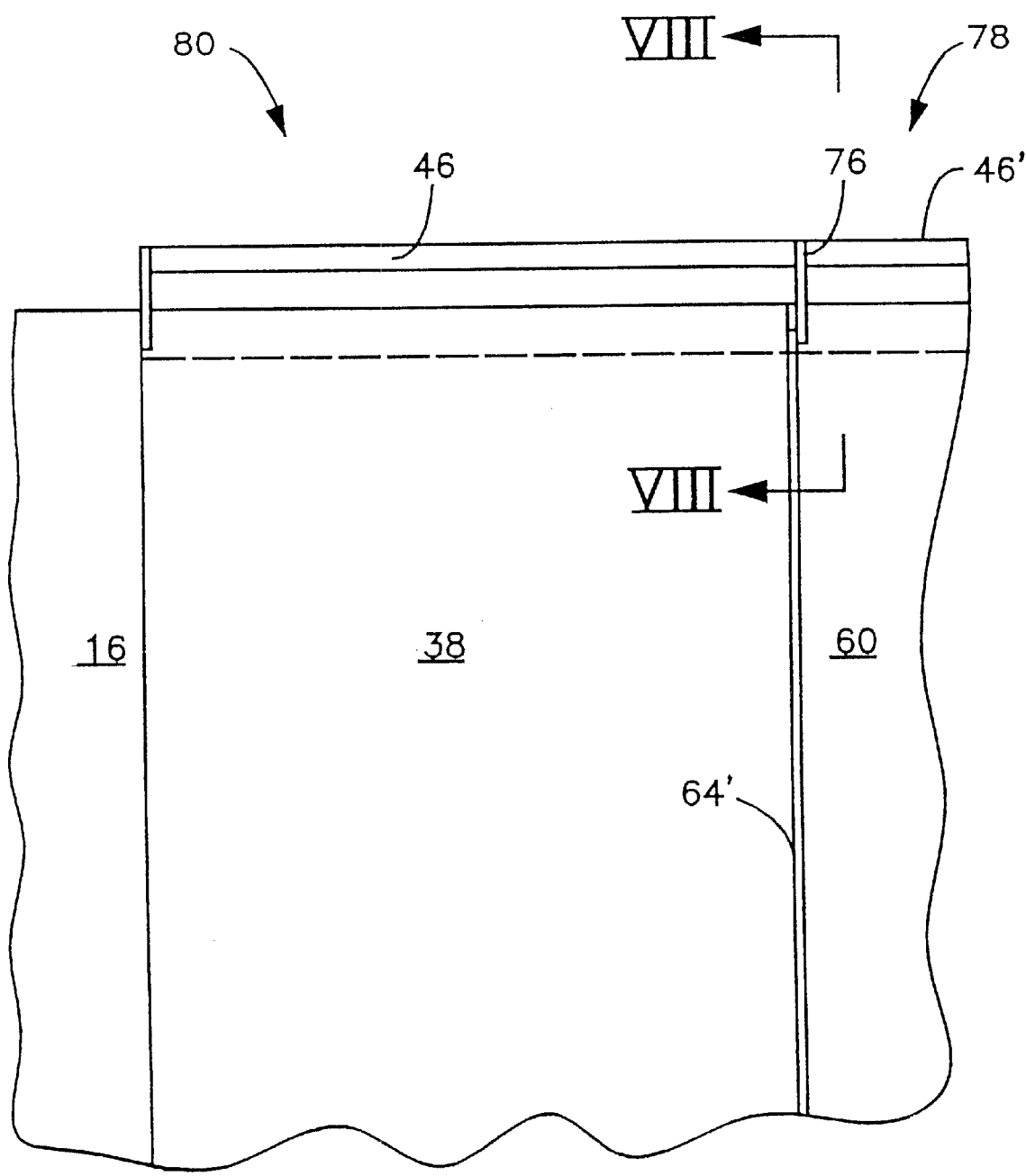
FIG. 7 is a cross section view taken along line VII—VII of FIG. 6 illustrating the post, a portion of one of the existing diaphragm plates, a portion of the intermediate diaphragm plate, a stay plate, a post seal, a radial seal, and a plenum seal.
Figure 8:
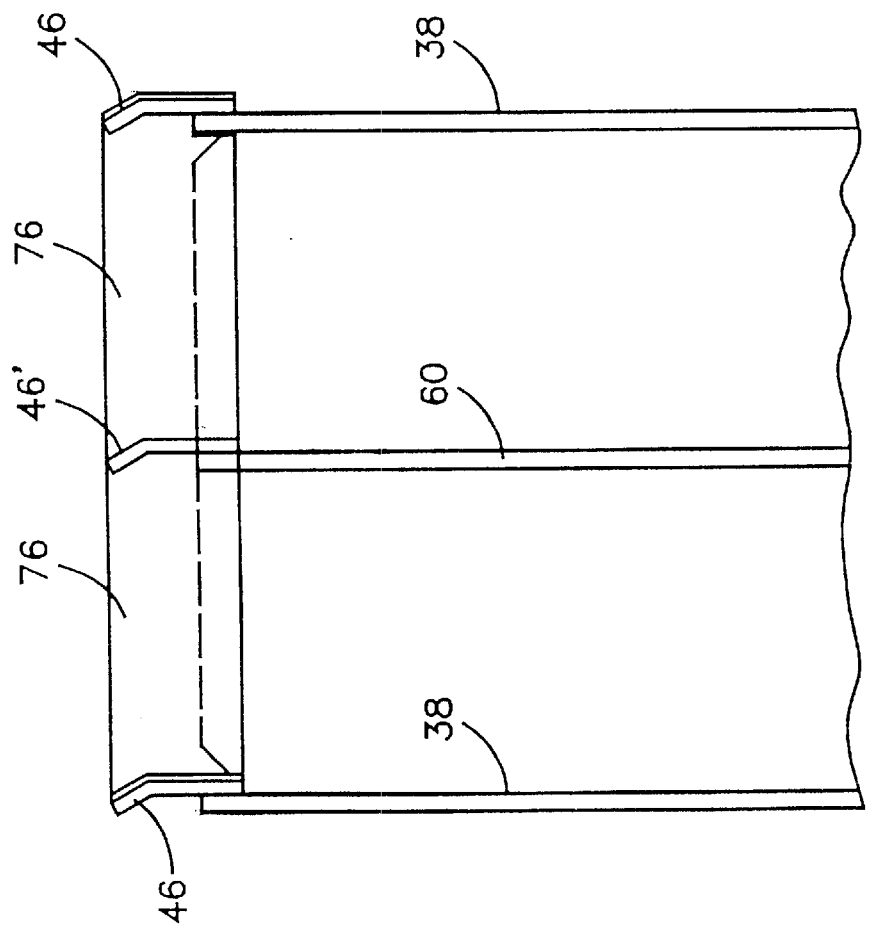
FIG. 8 is a cross section view taken along line VIII—VIII of FIG. 7.

With reference to FIGS. 7 and 8, the intermediate diaphragm plate 60 extends from the outboard side of the inner stay plate 64', 65 to the rotor shell 34. This leaves an area from the inboard side of the inner stay plate 64', 65 to the rotor post 16 that employs only single sealing. To isolate the transition area between the double and single seals a circumferential type plenum seal 76 is used on the hot and cold ends of the inner stay plate 64', 65. The plenum seal 76 blocks flow from the double seal plenum 78 to the single seal plenum 80. The plenum seal 76 extends between the radial seals 46 which are mounted on the existing diaphragm plates 38. The plenum seal 76 is designed and fabricated to a shape that allows it to fit the contours of the radial seals 46. The radial seal 46', which mounts on the intermediate diaphragm plate 60 extends between the plenum seal 76, and the rotor shell 34.

The amount of additional leakage that is allowed by this design as compared to a design utilizing double seals all the way to the post 16 is minimal. This is due to the fact that rotor turndown does not significantly increase the gap in the area between the post 16 and the inboard side of the inner stay plate 64', 65.

Figure 9:
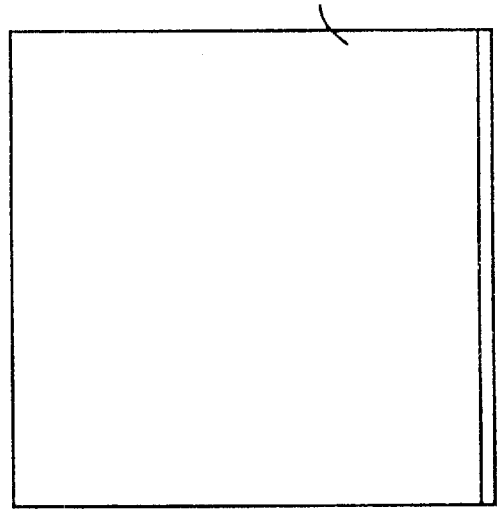
FIG. 9 is a plan view of an existing stay plate, illustrated as manufactured.
Figure 10:
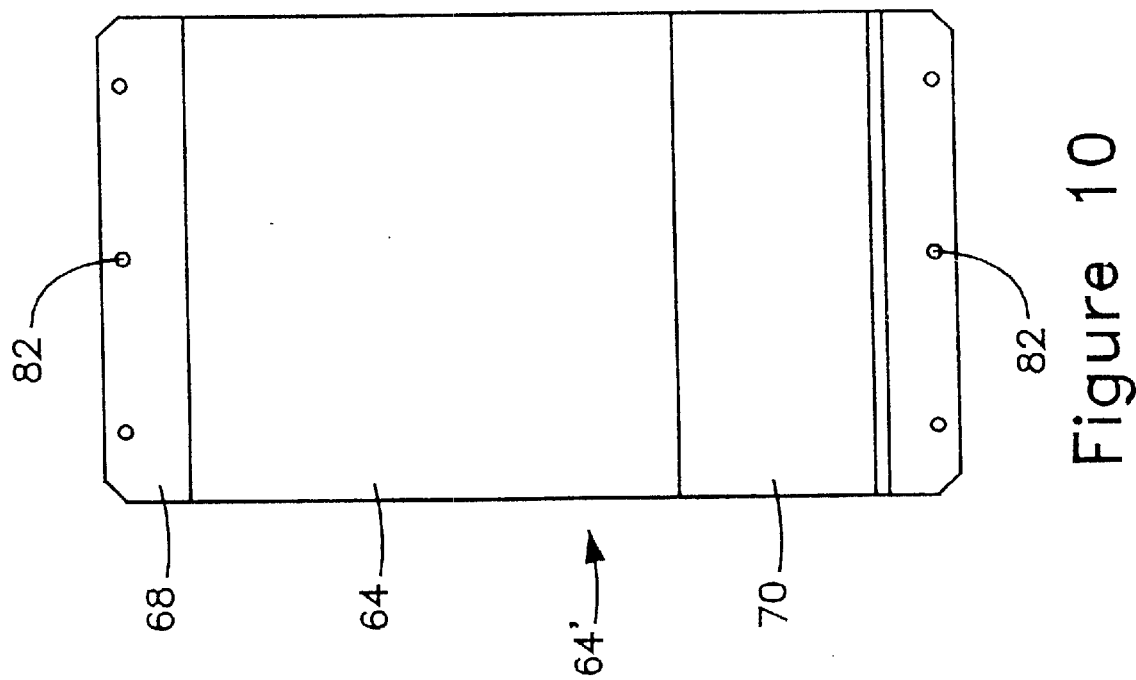
FIG. 10 is a plan view of an existing stay plate which has been modified to form an inner stay plate.
Figure 13:
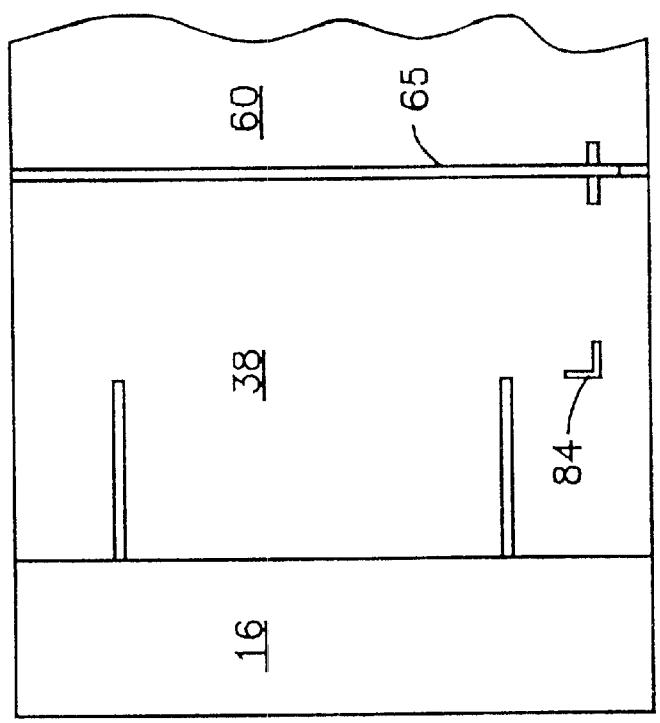
FIG. 13 is a cross section view of the inboard portion of the rotor of FIG. 7 illustrating a second example, in which the existing stay plates are not utilized, of the first embodiment of the invention.
Figure 12:
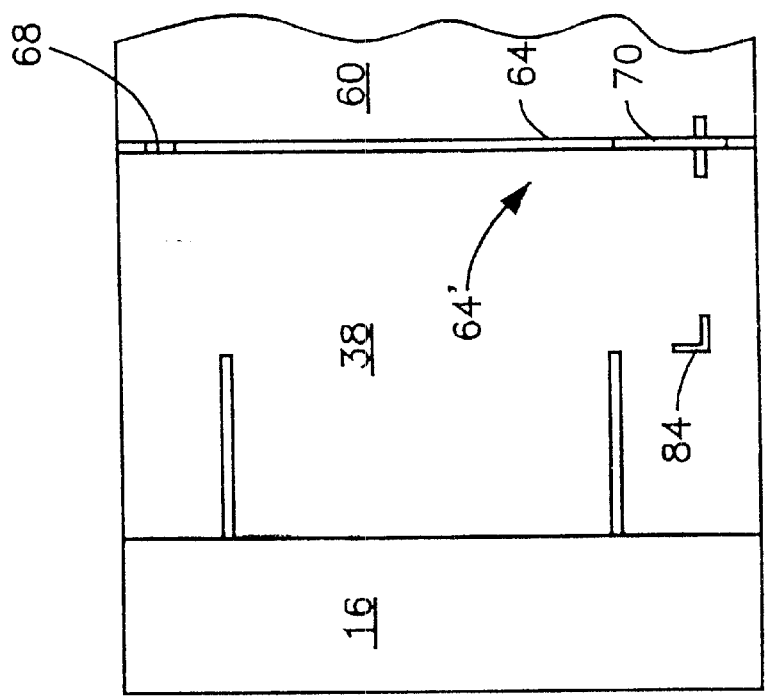
FIG. 12 is a cross section view of the inboard portion of the rotor of FIG. 7 illustrating a first example, in which the existing stay plates are utilized, of a first embodiment of the invention utilizing a combination of stay plates and gratings.
Figure 14:
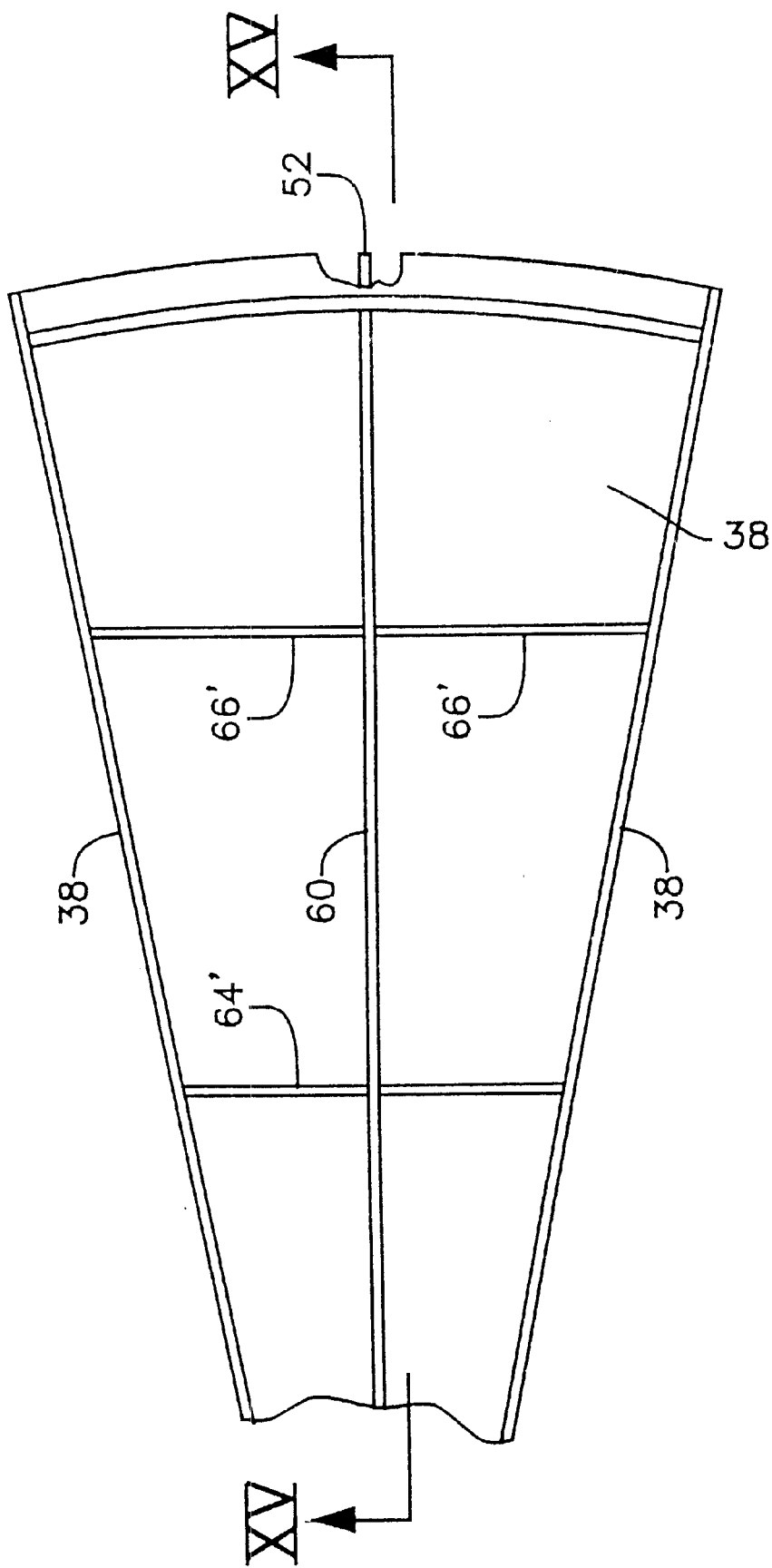
FIG. 14 is a top view of the outboard portion of the rotor of FIG. 3 illustrating a pair of the existing diaphragm plates, an intermediate diaphragm plate, stay plates, and a hot axial seal support bar.
Figure 15:
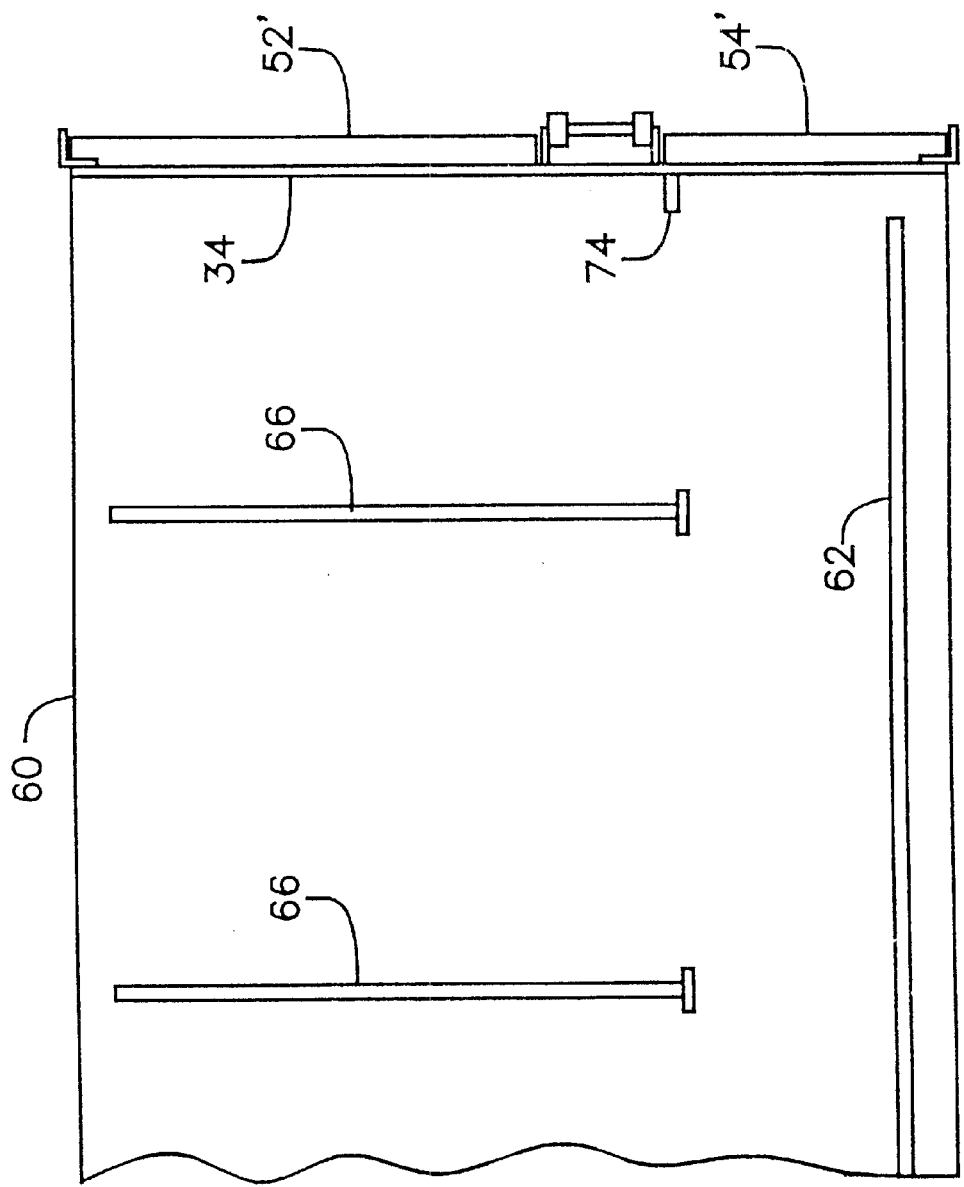
FIG. 15 is a cross section view taken along line XV—XV of FIG. 14 illustrating the first embodiment of the invention.
Figure 16:
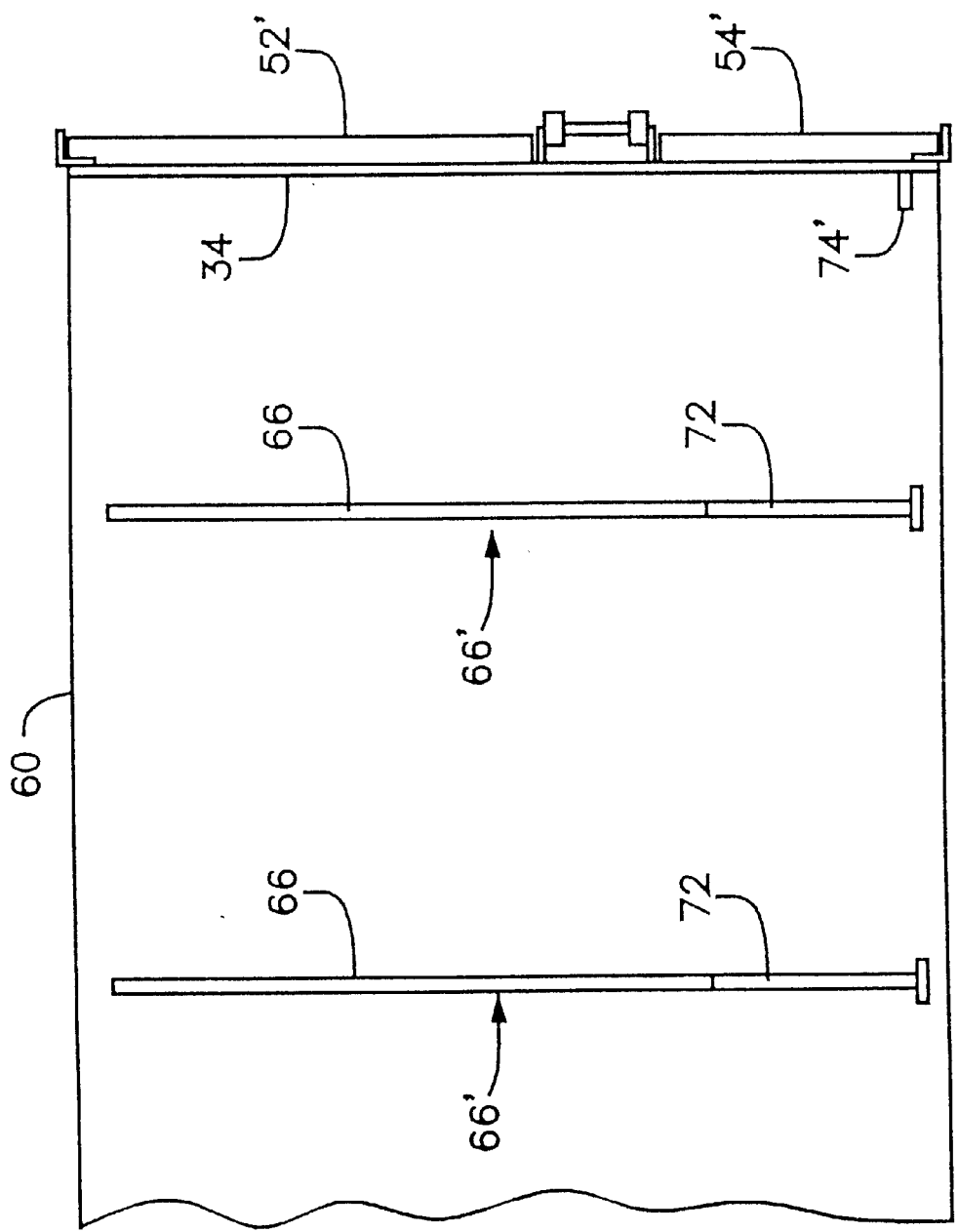
FIG. 16 is a cross section taken along line XV—XV of FIG. 7 illustrating a first example, in which the existing stay plates are utilized, of a second embodiment of the invention utilizing all stay plates.
Figure 17:
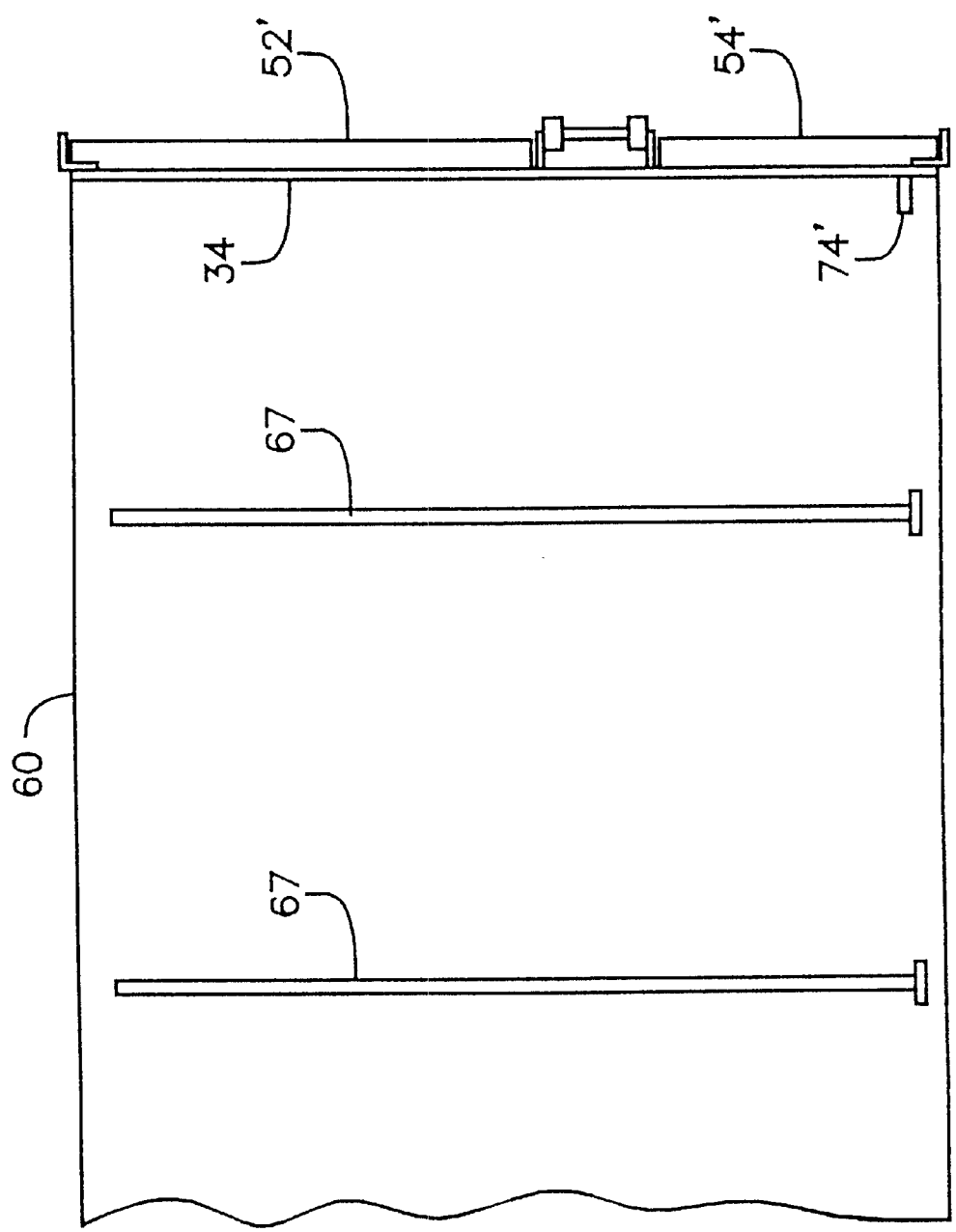
FIG. 17 is a cross section taken along line XV—XV of FIG. 7 illustrating a second example, in which the existing stay plates are not utilized, of the second embodiment of the invention.

As described below, the existing stay plates 64, 66 may be altered to form modified stay plates 64', 66' for reuse in an air preheater modified in accordance with the invention. Alternatively, the existing stay plates 64, 66 may be replaced with new stay plates 65, 67. The existing inner and outer stay plates 64, 66 all have the same shape (FIG. 9). FIG. 10 shows the addition of hot and cold inner stay plate extensions 68, 70 to the existing inner stay plates 64. These extensions 68, 70 are the same thickness or thinner than the existing stay plate 64. These extensions 68, 70 are welded to the existing diaphragm plates 38. The extensions 68, 70 may or may not be welded to the existing stay plate 64 as required to assure proper alignment. Both extensions 68, 70 incorporate mounting holes 82 for the installation of the plenum seal 76. The plenum seal 76 could also be welded into place.

Figure 11:
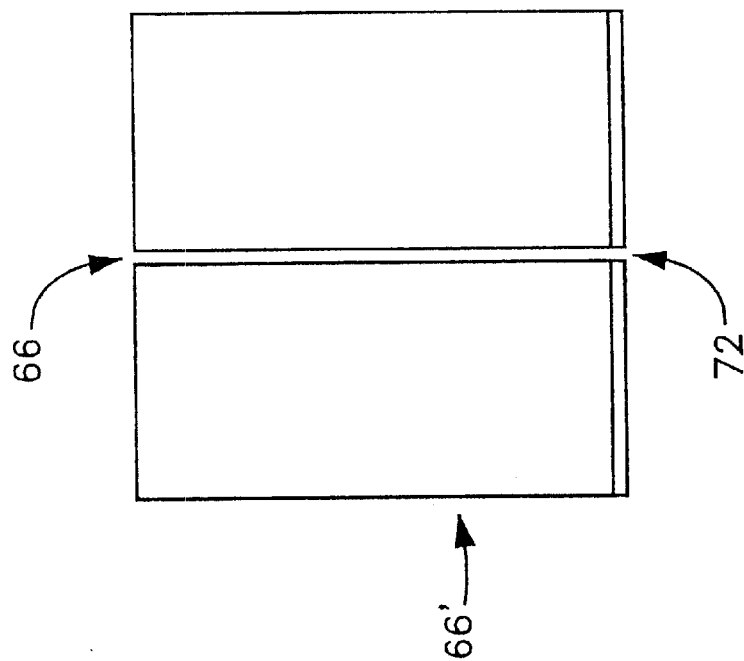
FIG. 11 is a plan view of an existing stay plate which has been modified to form an outer stay plate.

FIG. 11 shows the addition of a cold stay plate extension 72 to the existing outer stay plates 66. The extension 72 is the same thickness or thinner than the existing stay plate 66. The extension 72 is welded to the existing diaphragm plates 38 and the intermediate diaphragm plate 60. They may or may not be welded to the existing stay plate 66 as required to assure proper alignment. A strip of material equal to the thickness of the new intermediate diaphragm plate 60 is removed from the middle portion of the inner stay plates 66, dividing each of the inner stay plates 66 into two stay plate segments 66'.

To modify a conventional air preheater in accordance with the invention, the rotor 14 is emptied of all heat transfer baskets 40 and all the radial seals 46 and gratings 62 are removed. For a preheater having heat transfer basket support structures composed of a combination of stay plates 64, 66 and gratings 62, the basket support bar on the bottom of the existing inner stay plate 64 is removed and the existing outer stay plates 66 are divided into two segments 66' (as described above), if the existing stay plates 64, 66 are to be reused (FIGS. 6, 12, 14 and 15). The intermediate diaphragm plate 60 is installed in the center of the existing rotor compartment 36. The inner and outer stay plates 64, 66 are welded to the intermediate and existing diaphragm plates 60, 38 after the location of these components is verified. The extensions 68, 70, 72 are mounted to the inner and outer stay plates 64, 66. A new basket support angle 84 and new gratings 62 are located and installed. Hot and cold end axial seal support bars 52', 54' are welded to the rotor shell 34, in line with the intermediate diaphragm plate 60. Once these modifications are complete on the entire rotor, new heat transfer baskets 40' and seals 46, 46', 56, 56' are installed.

If the heat transfer basket support structure is to be composed of a combination of stay plates and gratings, and if the existing stay plates 64, 66 are not to be reused, new inner and outer stay plates 65, 67 are installed (FIGS. 6, 13, 14 and 15). The intermediate diaphragm plate 60 is installed in the center of the existing rotor compartment 36. The inner and outer stay plates 65, 67 are welded to the intermediate and existing diaphragm plates 60, 38 after the location of these components is verified. A new basket support angle 84 and new gratings 62 are located and installed. Hot and cold end axial seal support bars 52', 54' are welded to the rotor shell 34, in line with the intermediate diaphragm plate 60. Once these modifications are complete on the entire rotor, new heat transfer baskets 40' and seals 46, 46', 56, 56' are installed.

If the heat transfer basket support structure is to be composed of all stay plates, and if the existing stay plates 64, 66 are to be reused, the basket support bar on the bottom of the existing inner stay plate is removed (FIGS. 6, 12, 14 and 16). The existing support bar on the bottom of the existing outer stay plates 66 is removed and the existing outer stay plates 66 are divided into two segments 66'. The intermediate diaphragm plate 60 is installed in the center of the existing rotor compartment 36. The inner and outer stay plates 64, 66' are welded to the intermediate and existing diaphragm plates 60, 38 after the location of these components is verified. The extensions 68, 70, 72 are mounted to the inner and outer stay plates 64, 66'. A new basket support angle and a new basket support bar 74 are located and installed. Hot and cold end axial seal support bars 52', 54' are welded to the rotor shell 34, in line with the intermediate diaphragm plate 60. Once these modifications are complete on the entire rotor, new heat transfer baskets 40' and seals 46, 46', 56, 56' are installed.

If the heat transfer basket support structure is to be composed of all stay plates, and if the existing stay plates are not to be reused, new inner stay plates 65, 67 are installed (FIGS. 6, 13, 14 and 17). The intermediate diaphragm plate 60 is installed in the center of the existing rotor compartment 36. The inner and outer stay plates 65, 67 are welded to the intermediate and existing diaphragm plates 60, 38 after the location of these components is verified. A new basket support angle and a new basket support bar 74' are located and installed. Hot and cold end axial seal support bars 52', 54' are welded to the rotor shell 34, in line with the intermediate diaphragm plate 60. Once these modifications are complete on the entire rotor, new heat transfer baskets 40' and seals 46, 46', 56, 56' are installed.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A retrofit seal kit for use with an existing horizontal air preheater having a post, a rotor housing including a plurality of axial seal plates, sector plates on both axial ends of said air preheater, and a rotor located in said rotor housing and rotatable around said post, said rotor having a plurality of radially extending original diaphragm plates, a plurality of original radial seals, a plurality of original axial seal support bars, a plurality of original axial seals, a plurality of inner stay plates, a plurality of plenum seals, and a rotor shell, said original diaphragm plates forming compartments in said rotor, said rotor shell defining an outboard surface of said compartments, an original radial seal extending from each axial edge of each of said original diaphragm plates, an original axial seal support bar mounted to an outboard radial edge of each of said original diaphragm plates, an original axial seal extending from each of said original support bars, a plurality of inner stay plates, each of said stay plates being disposed in a compartment of said rotor intermediate said post and said rotor shell, said original diaphragm plates and said original radial seals extending from said post to said rotor shell, each of said original radial seals having an inboard portion extending from said post to said stay plates and an outboard portion extending from said stay plates to said rotor shell, said inboard portions of said original radial seals defining a single seal plenum, each of said plenum seals extending from one of said original radial seals to an adjacent one of said original radial seals, the seal kit comprising:

an intermediate diaphragm plate;

an intermediate axial seal extending from an outboard radial edge of said intermediate diaphragm plate; and an intermediate radial seal extending from each axial edge of said intermediate diaphragm plate;

wherein a one of said seal kits is adapted for mounting between each of said original diaphragm plates.

2. A seal kit as recited in claim 1 also comprising an additional axial seal support bar mounted to said outboard radial edge of said intermediate diaphragm plate, said intermediate axial seal extending from said additional support bar.

3. A seal kit as recited in claim 1 wherein said intermediate diaphragm plates and said intermediate radial seals extending from said stay plates to said rotor shell.

4. A seal kit as recited in claim 3, wherein said outboard portions of said original radial seals and said additional radial seals define a double seal plenum.

5. A seal kit as recited in claim 4, wherein each of said additional radial seals extends from one of said plenum seals to said rotor shell.

6. An improvement for an existing horizontal air preheater having a post, a rotor housing including a plurality of axial seal plates, sector plates on both axial ends of said air preheater, and a rotor located in said rotor housing and rotatable around said post, said rotor having a plurality of radially extending original diaphragm plates forming compartments in said rotor, a plurality of heat exchange baskets stored in said compartments, a plurality of gratings or stay plates mounted within said compartments for mounting said baskets, an original radial seal extending from each axial edge of each of said original diaphragm plates, and an original axial seal extending from an outboard radial edge of each of said original diaphragm plates, said improvement comprising an intermediate diaphragm plate mounted between each of said original diaphragm plates, an additional axial seal extending from an outboard radial edge of each of said intermediate diaphragm plates, and an additional radial seal extending from each axial edge of each of said intermediate diaphragm plates.

7. An air preheater as recited in claim 6, the rotor further having an original axial seal support bar mounted to said outboard radial edge of each of said original diaphragm plates, an original axial seal extending from each of said original support bars, said improvement further comprising an additional axial seal support bar mounted to said outboard radial edge of each of said intermediate diaphragm plates, an additional axial seal extending from each of said additional support bars.

8. An air preheater as recited in claim 6, wherein said rotor further comprises a plurality of inner stay plates and a rotor shell defining an outboard surface of said compartments, each of said stay plates being disposed in a compartment of said rotor intermediate said post and said rotor shell, said original diaphragm plates and said original radial seals extending from said post to said rotor shell, said intermediate diaphragm plates and said additional radial seals extending from said stay plates to said rotor shell, wherein each of said original radial seals has an inboard portion extending from said post to said stay plates and an outboard portion extending from said stay plates to said rotor shell.

9. An air preheater as recited in claim 8, wherein said inboard portions of said original radial seals define a single seal plenum and said outboard portions of said original radial seals and said additional radial seals define a double seal plenum, said rotor further comprising plenum seal means for retarding flow from said double seal plenum to said single seal plenum.

10. An air preheater as recited in claim 9, wherein said plenum seal means comprises a plurality of plenum seals, each of said plenum seals extending from one of said original radial seals to an adjacent one of said original radial seals, whereby each of said additional radial seals extends from one of said plenum seals to said rotor shell.

* * * * *